(12) United States Patent  
Shooshtari et al.

(10) Patent No.: US 9,034,952 B2  
(45) Date of Patent: May 19, 2015

(54) REDUCED SALT PRECIPITATION IN CARBOHYDRATE CONTAINING BINDER COMPOSITIONS

(71) Applicant: Johns Manville, Denver, CO (US)

(72) Inventors: Kiarash Alavi Shooshtari, Littleton, CO (US); Philip Francis Miele, Littleton, CO (US); Uranchimeg Lester, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 15 days.

(21) Appl. No.: 13/864,050

(22) Filed: Apr. 16, 2013

(65) Prior Publication Data

US 2014/0308453 A1    Oct. 16, 2014

(51) Int. Cl.
*D06M 13/165* (2006.01)
*C03C 25/26* (2006.01)
*C08J 5/24* (2006.01)
*C08L 5/00* (2006.01)

(52) U.S. Cl.
CPC ............ *D06M 13/165* (2013.01); *C03C 25/26* (2013.01); *C08J 5/24* (2013.01); *C08J 2305/00* (2013.01)

(58) Field of Classification Search
CPC ........ C08L 5/00; C08L 89/00; D06M 13/165; C03C 25/26; C08J 5/24
USPC .................. 524/27, 17, 56, 58; 427/394, 384; 106/162.1, 217.7, 217.6, 217.9
See application file for complete search history.

(56) References Cited

U.S. PATENT DOCUMENTS

| 2008/0194518 | A1* | 8/2008 | Mookerjee et al. | 514/55 |
| 2010/0222459 | A1* | 9/2010 | Kelly et al. | 524/17 |
| 2012/0037836 | A1 | 2/2012 | Hansen | |
| 2012/0205572 | A1 | 8/2012 | Hampson et al. | |

* cited by examiner

*Primary Examiner* — Michael M Bernshteyn
(74) *Attorney, Agent, or Firm* — Robert D. Touslee

(57) ABSTRACT

Aqueous binder compositions with reduced rates of salt precipitation are described. The compositions may include a carbohydrate and a sequestrant for sequestering one or more multivalent ions (e.g., $Ca^{2+}$, $Mg^{2+}$, $Ba^{2+}$, $Al^{3+}$, $Fe^{2+}$, $Fe^{3+}$, etc.). The sequestrant reduces a precipitation rate for the multivalent ions from the aqueous binder composition. Methods of reducing salt precipitation from a binder composition are also described. The methods may include the steps of providing an aqueous binder solution having one or more carbohydrates. They may also include adding a sequestrant for one or more multivalent ions to the aqueous binder solution. The sequestrant reduces a precipitation rate for the multivalent ions from the binder composition.

32 Claims, 4 Drawing Sheets

REDUCED SALT PRECIPITATION IN CARBOHYDRATE CONTAINING BINDER COMPOSITIONS

BACKGROUND

Manufacturers continue to develop replacement binder formulations to replace the traditional phenol-formaldehyde and urea-formaldehyde binders that have been used for decades. Formaldehyde is considered a probable human carcinogen, as well as an irritant and allergen, and its use is increasingly restricted in building products, textiles, upholstery, and other materials. In response, formaldehyde-free binder systems are being developed and commercialized.

The first generation of replacement binder systems included polycarboxylic acid formulations that polymerized polycarboxylic acids and alcohols. The polymerization reaction involved the esterification of the carboxylic acid groups on the polycarboxylic acids and the hydroxyl groups on the alcohols, which generated environmentally benign water as the main polymerization byproduct. However, the high concentrations of polycarboxylic acids in these binder formulations make them very acidic and create corrosion problems for the manufacturing equipment used to make fiberglass insulation and fiber-reinforced composites.

The first generation of replacement binders also tend to rely heavily on non-renewable, petroleum-based starting compounds. Increasing worldwide demand for fossil fuels has driven up the costs of these materials and created both economic and environment concerns about the sustainability of these binder systems. Thus, manufacturers have been developing a new generation of replacement binder formulations that reduce or eliminate petroleum-derived starting materials.

One promising new class of binder systems rely on carbohydrates as a sustainable, environmentally benign replacement for the petroleum-based starting compounds. Carbohydrate-based binder systems typically polymerize reducing sugar carbohydrates with a crosslinking compound to produce an effective binder for fiberglass insulation and other products. The polymerization process converts the water soluble carbohydrates into water insoluble polymers with good moisture resistance and aging characteristics.

Carbohydrate binder formulations normally start as aqueous solutions that are saturated with the starting carbohydrates. The formulations may also include polymerization catalysts that are often metallic ammonium salts of simple inorganic acids. Unfortunately, the high concentrations of carbohydrates in the aqueous binder solution substantially reduce its capacity for dissolving these salts. The poor solubility of the catalyst is compounded by the ions that commonly contaminate the industrial/municipal sources of water used in the binder solution. Between the multivalent ions that naturally contaminate the water source and the additional ions added by the catalyst, the binder solution often becomes oversaturated and precipitate out a quantity of the salts. As these salt precipitates build up in the equipment that transports the binder solution, they can cause frequent and costly maintenance shutdowns.

One way to reduce these shutdowns is to decontaminate the supply of water used to make the binder formulations. These decontamination techniques include running the water through ion exchange columns that replace a portion of the multivalent ions with monovalent ions such as sodium ($Na^+$) or potassium ($K^+$) ions. This process is sometimes referred to colloquially as water softening, and the ion exchange equipment as a water softener. Unfortunately, the ion exchange columns need frequent and costly recharging to reduce the multivalent ion concentrations to the levels needed, which has a significant effect on maintenance shutdowns and makes this approach impractical for most manufacturing applications. In addition, the addition of extra sodium ions can have an adverse effect on cure rate and water resistance in the cured binder. Thus, there remains a need to address the salt precipitation problems with carbohydrate binder solutions, and this and other problems addressed in the present application.

BRIEF SUMMARY

Binder formulations are described that include one or more sequestrants for multivalent ions that prevent the precipitation of the sequestered ions from the binder solution. These sequestrants can suppress salt precipitation rates from aqueous carbohydrate-containing binder solutions that have a low capacity for the dissolved ions (i.e., low solubility). However, it should be appreciated that the sequestrants can work in other aqueous binder systems with a low capacity for these ions, even if the cause of the capacity problem is not due to carbohydrate loading. Thus, embodiments of the present binder formulations can extend to binders with few or no carbohydrates.

Embodiments of the invention include aqueous binder compositions. The compositions may include a carbohydrate and a sequestrant for sequestering one or more multivalent ions (e.g., $Ca^{2+}$, $Mg^{2+}$, $Ba^{2+}$, $Al^{3+}$, $Fe^{2+}$, $Fe^{3+}$, etc.). The sequestrant reduces a precipitation rate for the multivalent ions from the aqueous binder composition.

Embodiments of the invention further include methods of reducing salt precipitation from a binder composition. The methods may include the steps of providing an aqueous binder solution having one or more carbohydrates. The methods may also include adding a sequestrant for one or more multivalent ions to the aqueous binder solution. The sequestrant reduces or eliminates a precipitation rate for the multivalent ions from the binder composition.

Embodiments of the invention still further include methods of making a fiber-containing composite. The method may include the steps of providing woven or non-woven fibers, and applying a binder composition to the woven or non-woven fibers. The binder composition may include a carbohydrate, a crosslinking agent, and a sequestrant for one or more multivalent ions. The application of the binder composition to the fibers makes a fiber-binder amalgam that may be cured and formed into the fiber-containing composite.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Figure 1:
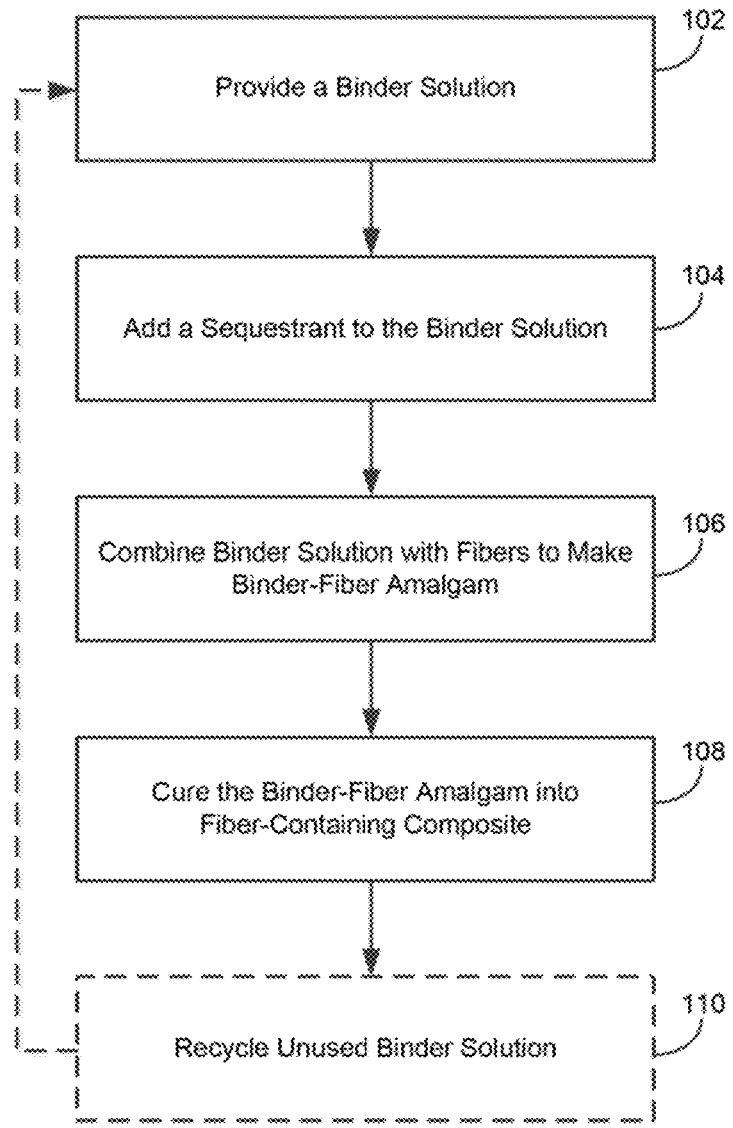
FIG. 1 shows a simplified schematic with selected steps in a method of making a fiber composite using the present binder formulations.

The present binder formulations include a sequestrant in an aqueous binder solution. The formulations may include a variety of binder systems with a low salt capacity (i.e., a low solubility for multivalent cation salts) that employ the sequestrant to reduce or eliminate the precipitation of the salts as the binder solution is being prepared, applied and/or cured. Exemplary binder systems may include polymeric binder reactants such as polycarboxylic acids, polyhydric alcohols, carbohydrates, amines, and/or crosslinking agents, among others. As noted above, frequent salt precipitation was noted in binder formulations containing carbohydrate reactants (e.g., reducing sugars) that lower the saturation concentration of multivalent salts in the solution. Reformulating these binder systems to include at least one of the present sequestrants significantly reduces precipitation of the multivalent salts.

Exemplary sequestrants include polycarboxylic acid compounds that have two or more carboxylic acid groups, three or more carboxylic acid groups, four or more carboxylic acid groups, five or more carboxylic acid groups, etc. For example, ethylenediaminetetraacetic acid (EDTA) and citric acid, having the structural formulas shown below, may be sequestrants:

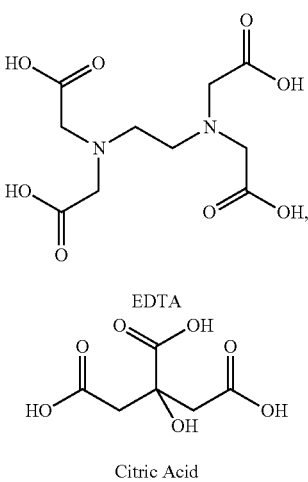

EDTA

Citric Acid

Other amino-carboxylic acids include ethylenediaminetetrasuccinic acid, tetraitaconicacid and/or their salts with ammonia, amine, and/or alkali metal ions such as $Na^+$ and $K^+$.

Exemplary sequestrants also include polyphosphonic acid and polyphosphoric acid compounds that have two or more phosphonic acid groups ($-PO(OH)_2$), three or more phosphonic acid groups, four or more phosphonic acid groups, five or more phosphonic acid groups, etc. For example, ethylenediaminetetramethylenephosphonic acid (EDTMP), having the structural formula shown below, may be a sequestrant:

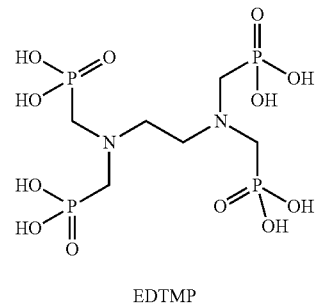 [SMILES: O=P(O)(O)CN(CCN(CP(=O)(O)O)CP(=O)(O)O)CP(=O)(O)O]

EDTMP

Polyphosphoric acids may have the following structure, having the structural formula shown below, may also be a sequestrant:

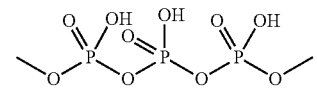

The present sequestrants may still further include polyacrylic acid compounds that have two or more carboxylic acid groups or salts thereof. As noted below, the polyacrylic acid compounds may be added in low concentrations to the binder solution (e.g., about 1 wt. % or less) where the function primarily as a sequestrant. Alternatively, they may be added in higher concentrations where they can make a signification contribution to the physical and mechanical properties of the binder as well as act as a sequestrant.

The present sequestrants show efficacy at sequestering multivalent cations such as alkali earth metal cations, and transition metal cations, among other multivalent cations. Examples of these multivalent cations include calcium ions ($Ca^{2+}$), magnesium ions ($Mg^{2+}$), barium ions ($Ba^{2+}$), aluminum ions ($Al^{3+}$) and iron ions ($Fe^{2+}$, $Fe^{3+}$), among others. The sequestered ions remain dissolved in the aqueous binder solution even beyond the saturation limit for an unsequestered solution.

The efficiency level of a sequestrant may be measured as the threshold concentration level (e.g., wt. %) of the sequestrant required to prevent precipitation of a standardized binder solution at temperatures used in composite manufacturing processes. The present sequestrants may have efficacy levels ranging from about 0.1 wt. % to about 2 wt. % of the binder solution. For example, the sequestrant may have an efficacy level of about 0.5 wt. % or less, about 0.4 wt. % or less, about 0.3 wt. % or less, about 0.2 wt. % or less, etc.

Exemplary Sequestrant-Containing Binder Systems

The exemplary binder formulations may include the sequestrants combined with renewable materials such as carbohydrates (e.g., dextrose, fructose, starches, celluloses, hemicellulases. etc.), and/or proteins (e.g., soy flour), among other renewable materials. When the binder formulation includes reducing sugar carbohydrates, they may also include one or more nitrogen-containing compounds. The nitrogen containing compounds may include ammonia, ammonium salts, amines, amides, amino acids, imides, and reaction products of urea and aldehyde reactants, among other compounds. The binder formulations may further include adhesion prompters, oxygen scavengers, solvents, emulsifiers, pigments, organic and/or inorganic fillers, flame retardants, anti-migration aids, coalescent aids, wetting agents, biocides, plasticizers, organosilanes, anti-foaming agents, colorants, waxes, suspending agents, anti-oxidants, and secondary crosslinkers, among other components.

The nitrogen-containing compounds may include a variety of compounds that can distinguish a class of carbohydrate binders. One class of binders uses an amino-amide as the nitrogen containing compound, which itself is a reaction product of an amine with a saturated or unsaturated reactant. Another class uses nitrogen-containing compounds that are reaction products of urea compounds and aldehyde-containing compounds. Some exemplary classes of carbohydrate-and-nitrogen-containing binders are described in more detail below.

I. Carbohydrate-and-Nitrogen Containing Binders

1. Carbohydrate/Amino-Amide Binder Formulations

The nitrogen-containing compounds may include amines capable of undergoing conjugate addition with a saturated or unsaturated reactant to form an amino-amide. The amino-amide then reacts during curing with the carbohydrate to form a polyimide. The amino-amide addition products may be formed by mixing the amine and saturated or unsaturated reactant in an aqueous medium at room temperature. The resulting addition products are either water-soluble, water-dispersible, or are present as an emulsion. In some binder formulations, the formation of the amino-amide from the reaction of the amine precursor with the saturated or unsaturated reactant may occur before the introduction of the carbohydrate, while other formulations mix all three precursors (i.e., the amine, saturated or unsaturated reactant, and carbohydrate) before the amino-amide is formed.

Each amine may have two or more primary and/or secondary amine groups to react and crosslink two or more carbohydrate molecules. The amines may include aliphatic, cycloaliphatic and aromatic amines. They may be linear or branched, and have additional functionalities and linkages such as alcohols, thiols, esters, amides, acids, and ethers, among others. Exemplary amines may include 1,2-diethylamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines. Natural and synthetic amino acids such as lysine, anginine, hestidine, etc., may also be used.

The curable amino-amide is formed through the selection of an unsaturated or saturated reactant that is an anhydride, carboxylic acid, ester, and salts and mixtures of such reactants. These unsaturated reactants may include maleic acid, fumaric acid, maleic anhydride, mono- and di-esters of maleic acid and fumaric acid, and salts and mixtures of these. Ammonium salts of the unsaturated acids of their monoesters conveniently can be utilized. Saturated reactants may include, without limitation, succinic anhydride, succinic acid, mono and diesters of succinic acid, glutaric acid and anhydride, phthalic acid and anhydride, tetrahydro phthalic acid and anhydride, mono and diesters of acid anhydrides and salts of the acids, and their mono esters.

In some formulations, the amino-amide product may be oligomerized before reacting with the carbohydrate. This oligomerization may be facilitated by heating the amino-amide solution until the amino-amide is dimerized, trimerized, tetramerized, etc., into the amino-amide oligomer. The heating conditions may include raising the temperature of the amino-amide solution to, for example, 120° C. to 150° C. for a time of up to 5 hours. In some instances, the oligomerized amino-amide product forms a stronger, more rigid cured binder product than then amino-amide monomer.

Then during the binder curing step, the majority of the carbohydrate reacts with the amino-amide intermediate, which contains an amic acid functional group, (i.e., an amide linkage in the vicinity of a carboxylic acid). An amic acid functional group is typically more reactive than a simple carboxylic acid. The amount of carbohydrate added is generally such that the molar ratio of carboxylic acid in the amino-amide to carbonyl or ketone in the carbohydrate is from 1:5 to 50:1, for example a ratio of 1:20 to 20:1, or a ratio of 1:10 to 10:1. Additional details about carbohydrate/amino-amide binder formulations are described in co-assigned U.S. patent application Ser. No. 12/539,263 to Shooshtari et al, filed Aug. 11, 2009, and titled "Curable Fiberglass Binder," the entire contents of which are herein incorporated by reference for all purposes.

2. Carbohydrate/Urea Derivative Binder Formulations

The nitrogen-containing compounds may include urea derivative reaction products of urea (i.e., $H_2N$—$CO$—$NH_2$), and/or substituted ureas, with diformaldehyde compounds such as glyoxal. One specific class of these urea derivatives include imidazolidine compounds such as 4,5-dihydroxyimidazolidin-2-one, which has the chemical structure:

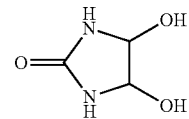

4,5-dihydroxyimidazolidin-2-one

More specifically, the urea compound may be a substituted our unsubstituted urea having the formula:

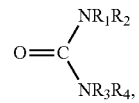

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —$(CH2)_n$—, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —$(CH2)_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —OR$_x$, where R$_x$ is an alkyl group.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, and polyfurfural among others. Exemplary aldehyde-containing compounds may also include substituted glyoxal compounds having the formula:

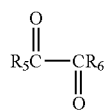

where R$_5$ and R$_6$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde-containing compound may include an imidazolidine compound having the formula:

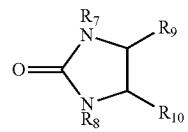

where R$_7$, R$_8$, R$_9$, and R$_{10}$ are independently, —H, —OH, —NH$_2$, an alkyl group, an aromatic group, an alcohol group, an aldehyde group, a ketone group, a carboxylic acid group, and an alkoxy group. In one specific example of the reaction between urea and glyoxal, the reaction product may be 4,5-dihydroxyimidazolidin-2-one.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions have a pH that creates relatively little or no acid-based corrosion of metal fabrication equipment.

The reaction product of the urea derivative nitrogen-containing compound acts as a crosslinking agent for the carbohydrate. During a curing stage, the urea derivative can bond to two or more carbohydrates (either polymerized or unpolymerized) to form a crosslinked, polymeric cured binder.

The molar ratio of the (1) crosslinking reaction product of the urea compound and the aldehyde-containing compound to (2) the carbohydrate generally ranges from 1:2 to 1:50. Exemplary ratios of crosslinking agent to carbohydrate include a range from 1:4 to 1:10. Additional details about carbohydrate/urea derivative binder formulations are described in co-assigned U.S. patent application Ser. No. 13/490,638 to Shooshtari et al, filed Jun. 7, 2012, and titled "Formaldehyde-Free Binder Compositions with Urea-Formaldehyde Reaction Products," the entire contents of which are herein incorporated by reference for all purposes.

3. Carbohydrate/Nitrogen-Containing Salt Binder Formulations i. Salts of Inorganic Acids with Amines In additional carbohydrate binder formulations, the nitrogen-containing compounds may include a nitrogen-containing salt. For example, the nitrogen-containing compound may include the salt product of the combination of an inorganic acid and an amine (e.g., an amine-acid salt). Exemplary inorganic acids may include a phosphorous-containing acid such as phosphoric acid, pyrophosphoric acid, phosphorous acid, and phosphine, among others. Exemplary inorganic acids may also include oxygenated inorganic acids such as sulfuric acid, sulfurous acid, nitric acid, boric acid, hypochloric acid, chlorate acid, among others. They may also include non-oxygenated inorganic acids such as hydrochloric acid and hydrogen sulfide, among others.

Exemplary amines may include polyamines (e.g., diamines, triamines, etc.) having at least one primary amine group. For example, the amines may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines.

When the amine-acid salt reacts with the carbohydrate under binder curing conditions the binder is formed. Exemplary binder systems include the combination of an amine-acid salt of 1,6-hexanediamine and phosphoric acid with the carbohydrate dextrose (HPD), the combination of an amine-acid salt formed from the combination of ethylene diamine and phosphoric acid with dextrose (EPD). Additional details about these amine-acid salt and carbohydrate binder formulations are described in co-assigned U.S. patent application Ser. No. 12/539,211, filed Aug. 11, 2009 to Shooshtari, the entire contents of which are herein incorporated by reference for all purposes.

ii. Salts of Inorganic Acids with Amines and Organic Species

Some carbohydrate/amine-acid salt binder formulations further include some combination of an organic acid, organic anhydride, and/or an alkanol amine. Exemplary organic acids may include polycarboxylic acid such as citric acid and or maleic acid. Exemplary organic anhydrides may include maleic anhydride, phthalic anhydride, methylphthalic anhydride, glutaric anhydride, tetrahydrophthalic anhydride, perhydrophthalic anhydride, itaconic anhydride, succinic anhydride, and trimellitic anhydride, among other anhydrides.

Exemplary alkanol amines may have the formula:

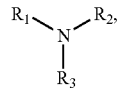

where R$_1$, R$_2$, and R$_3$ are independently chosen from, a hydrogen, a C$_{1-10}$ alkyl group, an aromatic group, and a C$_{1-10}$ hydroxy alkyl group, and wherein at least one of R$_1$, R$_2$, and R$_3$ is a hydroxyl alkyl group.

Specific examples of alkanol amines may include methanol amines such as mono-, di-, and tri-, methanol amine; ethanol amines such as monoethanol amine (MEA), diethanol amine (DEA), and triethanol amine (TEA); isopropanol amines such as mono-, di-, and tri-, isopropanol amine; methyldiethanol amine; ethyldiethanol amine; propyldiethanol amine; isopropyldiethanol amine; and n-butyldiethanol amine, among others.

Exemplary carbohydrate binder formulations may include the combination of a carbohydrate, amine-acid salt, and organic acid. These include binder formulations of dextrose, ethylene diamine phosphate, and citric or maleic acid. Additional details about these carbohydrate/amine-acid salt/organic acid binder formulations are described in co-assigned U.S. patent application Ser. No. 13/478,765, filed May 23, 2012 to Shooshtari et al, the entire contents of which are herein incorporated by reference for all purposes.

Exemplary carbohydrate binder formulations may also include the combination of a carbohydrate, amine-acid salt, organic anhydride, and alkanol amine. This include binder formulations of the reaction products of monoethanol amine ("E") and maleic anhydride ("M") combined with ethylenediamine phosphate ("EP") and dextrose ("D") to make binder compositions referred to as EMEPDs. In still other exemplary binder formulations, the amine-acid salt may be eliminated. This includes formulations of the reaction products of monoethanol amine ("E") and maleic anhydride ("M") with the carbohydrate dextrose to make binder compositions referred to as EMDs. Additional details about these carbohydrate/amine-acid salt/anhydride-alkanol amine binder formulations are described in co-assigned U.S. patent application Ser. No. 13/559,769, filed Jul. 27, 2012 to Shooshtari et al, the entire contents of which are herein incorporated by reference for all purposes.

Exemplary binder formulations may include additional compounds combined with the reducing sugar, organic acid, and amine salt of an inorganic acid. For example, urea may also be included with the other binder components. Exemplary, urea-containing binder compositions may include ethylene diamine phosphate ("EP"), citric acid ("C"), urea ("U"), and dextrose ("D") combined to make a binder composition referred to as EPCUD. Exemplary molar ratios of these components may include Ethylenediamine:Phosphoric Acid:Citric Acid:Urea:Dextrose of 1:1:0.5:1:6.

iii. Ammonium Salts of Carboxylic Acids

In still additional carbohydrate binder formulations, the nitrogen-containing compounds may include an ammonium salt of a polycarboxylic acid. Exemplary ammonium salts of polycarboxylic acids may be formed from the reaction of ammonia ($NH_3$) with the polycarboxylic acid to form the ammonium salt. It should be appreciated that other types of ammonium ions can function as the cation in the ammonium-polycarboxylate salt, such as $(NH_3R_1)^+$, $(NH_2R_1R_2)^+$, and $(NHR_1R_2R_3)^+$, where $R_1$, $R_2$, and $R_3$ are each independently chosen from an alkyl, cycloalkyl, alkenyl, cycloalkenyl, heterocyclyl, aryl, and heteroaryl, among other organic groups.

Exemplary polycarboxylic acids may include dicarboxylic acids, tricarboxylic acids, etc. Dicarboxylic acids may include maleic acid, and tricarboxylic acids may include citric acid.

The binder formulations may include the combination of a carbohydrate (e.g., a reducing sugar) with the ammonium salt of the polycarboxylic acid. For example, the binder composition may include dextrose and triammonium citrate.

4. Carbohydrate Blends with Latex and/or Solution Polymers

This group of carbohydrate binder compositions is distinguished by the inclusion of the components of a second binder in the formulation. The second binder may be a latex binder and/or solution polymer with a significantly higher viscosity than the carbohydrate binder composition. In some instances, the second binder may act as the sole thickening agent in the carbohydrate binder composition, while in other instances the second binder may complement other thickening agents to get the composition to a target viscosity.

The second binder may include latex binders having a Brookfield viscosity of about 100 cPs or more (spindle 18 operating at a speed of 60 rpm) at 20° C. Exemplary second binders may include acrylic binders, among others. The second binder may be present up to about half the weight of the total binder composition (e.g., 1 to 50 wt. %; 1 to 20 wt. %; etc.).

II. Blends of Carbohydrate and Acrylic Acid Binders

The present binder compositions may also include blends of carbohydrate-containing binder compositions and polyacrylic acid containing binder compositions. For example, one of the above-described carbohydrate-and-nitrogen containing binder compositions may be combined with a polyacrylic acid binder to create a blended binder composition. The polyacrylic acid component may act as both a sequestrant and a binder, eliminating the need for an additional sequestrant in the binder composition.

Exemplary concentration ratios of the polyacrylic binder to the carbohydrate binder may range from about 0.5:99.5 to about 50:50. A small ratio of the polyacrylic binder (e.g., about 2 wt. % or less) is used when the polyacrylic compound functions primarily as a sequestrant, while larger ratios increase the effect of the polyacrylic acid on the physical and mechanical properties of the composite. For both low and high ratios, the polyacrylic acid may act as the exclusive sequestrant to slow or prevent the precipitation of multivalent salt compounds, or may act in combination with one or more additional sequestrants to sequester the multivalent ions in the binder composition.

The polyacrylic binder compositions may also include crosslinkers, catalyst, and other compounds that facilitate the polymerization of the binder. Exemplary crosslinking agents may include alkanol amines such as triethanol amine. Exemplary catalysts may include hypophosphite compounds such as sodium hypophosphite (SHP).

III. Multivalent Salt Catalysts for Binder Systems

Many binder formulations, including many carbohydrate-and-nitrogen containing binder formulations, include catalysts to increase polymerization rates as the binder cures. These catalysts often include metallic salts, including multivalent cation salts.

Exemplary binder catalysts may include alkaline catalysts and acidic catalysts. The acidic catalysts may include Lewis acids (including latent acids and metallic salts), as well as protic acids, among other types of acid catalysts. Lewis acid catalysts may include a multivalent cation salt of a deprotonized anion such as a sulfate, sulfite, nitrate, nitrite, phosphate, halide, or oxyhalide anion, among other anions. The multivalent cation may include in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., R—S$(=O)_2$—OH) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

Exemplary Methods of Making Fiber Composites

The present sequestrant-containing binder formulations may be used in methods of making a variety of fiber composites. FIG. 1 shows a flowchart with selected steps in a method 100 of making a fiber composite using the present binder formulations. The method 100 may include providing a binder solution 102 that may include multivalent ion containing components, such as a polymerization catalyst. A multivalent ion sequestrant may be added to the binder solution 104 to reduce or prevent the precipitation of salts from the binder solution.

The sequestrant-containing binder solution may be added to fibers to make a binder-fiber amalgam 106. The binder solution may be applied to the fibers by a variety of techniques including spraying, spin-curtain coating, curtain coating, and dipping-roll coating. The composition can be applied to freshly-formed fibers, or to fibers that have been cooled and processed (e.g., cut, coated, sized, etc.). In method 100, the binder solution is provided to the applicator as a premixed composition. Alternate techniques may be used, such as having separate components of the binder formulation supplied to the applicator in separate solutions. For example, separate binder and sequestrant solutions may be applied directly on the fibers.

The binder-fiber amalgam may be cured and the fiber-containing composite may be formed 108. Techniques for curing the binder composition may include exposing the composition applied to the fibers to an environment conducive to curing. For example, the curable amalgam of fibers and binder composition may be heated to a binder curing temperature. Exemplary binder curing temperatures may include a temperature range from 100° C. to 250° C. The curing amalgam may be heated to the curing temperature for a period of 1 minute to 100 minutes (e.g., 20 minutes). In some exemplary methods, additional agents like an anti-dusting agent may be applied during or following the curing step 108.

Excess binder solution is often applied to the fibers during the application step, and at least a portion of this unused binder may be recaptured and optionally recycled back in to the binder solution 110 applied to the fibers. It should be noted that the exposure of the unused binder solution to the fibers may cause the introduction of more multivalent ions from the fibers. The additional ions leached from the fibers may be sequestered with the sequestrant that is added to the binder solution.

Figure 2:
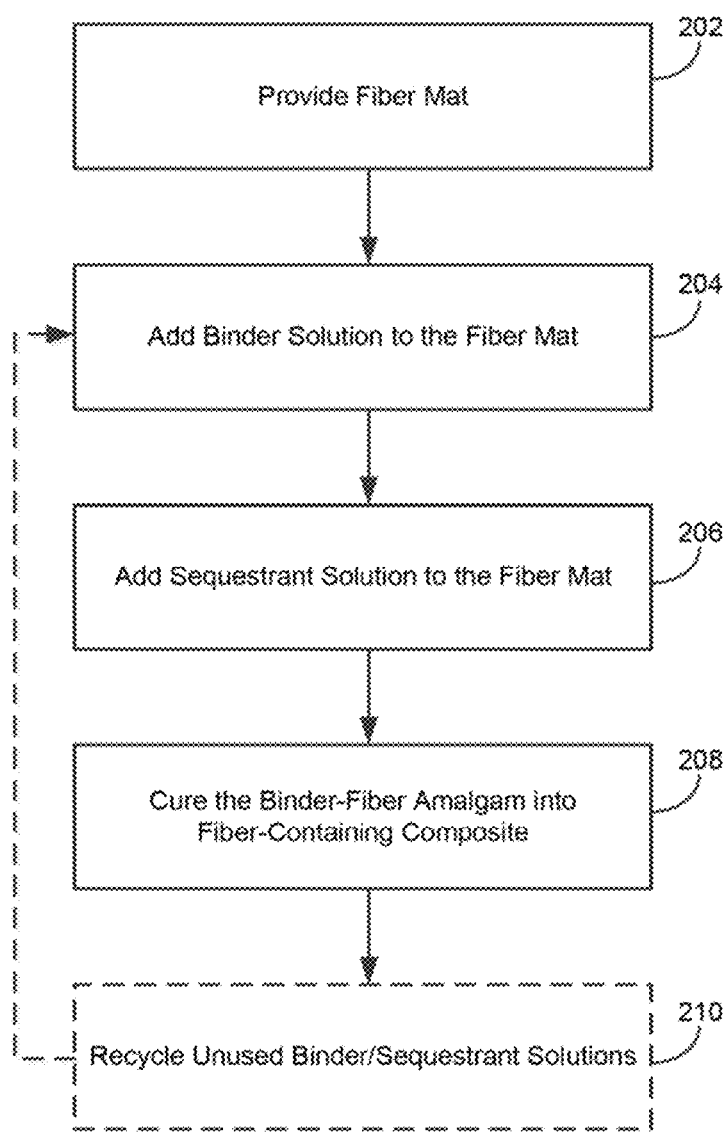
FIG. 2 shows a simplified schematic with selected steps in a method of making a fiber composite using the present binder formulations.

Referring now to FIG. 2, another method 200 of using the present binder formulations to make fiber composites is illustrated. The method 200 may include the step of providing a fiber mat 202. When the fiber composite is fiberglass insulation, the fiber mat is normally a non-woven mat of glass fibers. Other fiber composites may have additional types of fibers such as carbon fibers, inorganic fibers, mineral fibers, and organic polymer fibers, among other types of fibers.

In method 200, the binder solution may be added to the fiber mat 204, and a sequestrant solution may be added to the fiber mat 206. The two solutions may be kept separate until they are added to the mat and may be supplied is separate steams to the mat. When they are applied as separate streams, they may be applied simultaneously or sequentially to the mat. For example, the sequestrant solution may be applied before, concurrently, or after the binder solution is applied to the mat.

The application of the binder and sequestrant solutions to the fiber mat form a binder-fiber amalgam that may be cured into the fiber-containing composite 208. Similar to method 100, unused binder and sequestrant solutions may be captured and the unused binder/sequestrant mixture may be recycled into the binder solution.

Exemplary Fiber Composite Fabrication Systems

Figure 3:
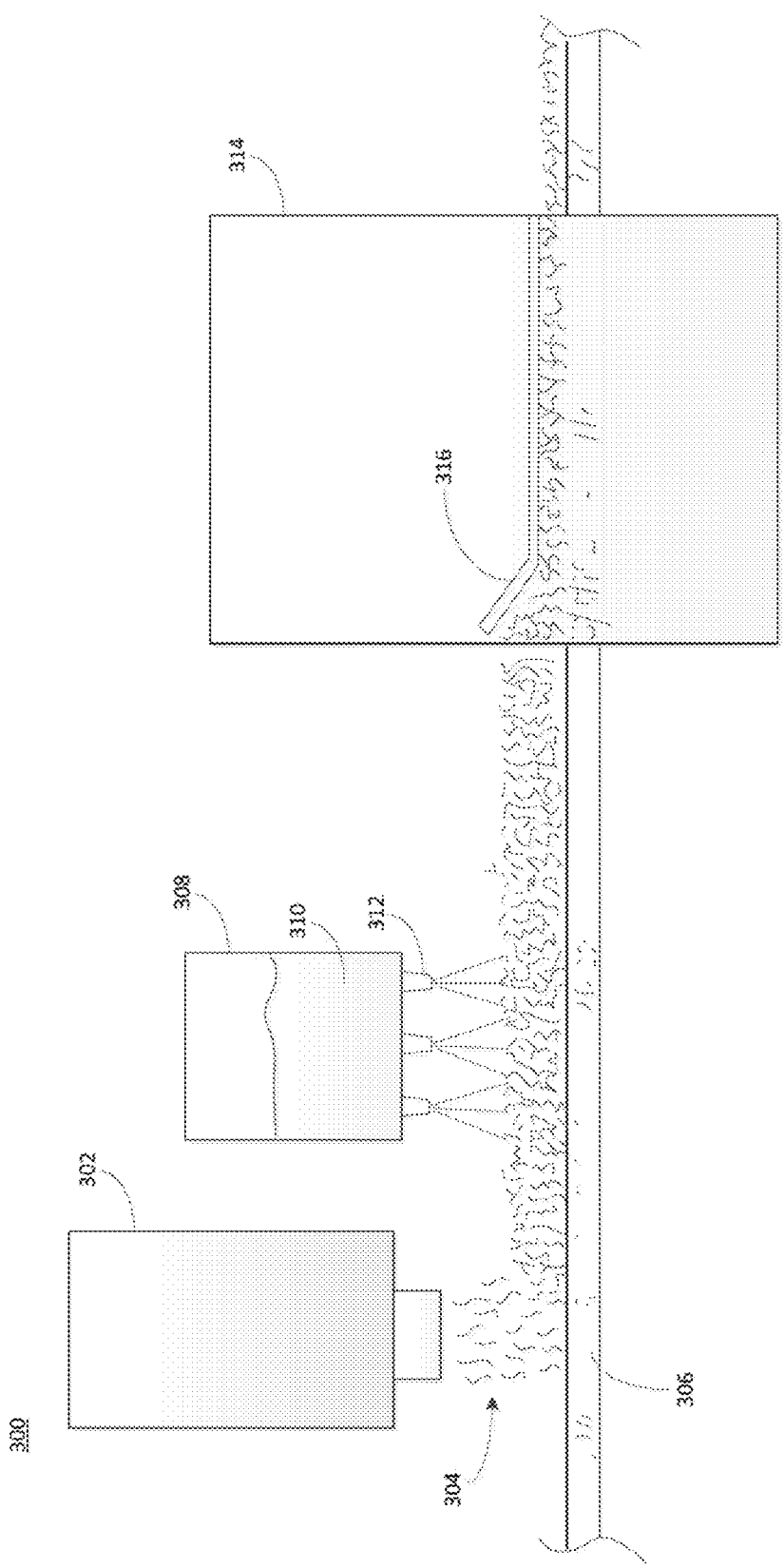
FIG. 3 depicts a simplified schematic of an exemplary fabrication system for making the fiber-containing composites according to embodiments of the invention.

The sequestrant-containing binder formulations may be used to make a variety of fiber-reinforced composites, including fiberglass insulation, glass fiber mats for roofing shingles, and fiberglass facers, among other products. FIG. 3 shows a simplified schematic of an exemplary fabrication system 300 that may be used to make fiber-containing composites. The system 300 includes fiber supply unit 302 that supplies the fibers for the composite. The fiber supply unit 302 may be filled with pre-made fibers, or may include equipment for making the fibers from starting materials such as molten glass. The fiber supply unit 302 deposits the fibers 304 onto a porous conveyor belt 306 that transports the fibers under the binder supply unit 308.

The binder supply unit 308 contains a liquid uncured binder composition 310, that is deposited onto the fibers 304. In the embodiment shown, the binder composition 310 is spray coated onto the fibers 304 with spray nozzles 312, however, other application techniques (e.g., curtain coating, dip coating, etc.) may be used in addition to (or in lieu of) the spray coating technique illustrated by nozzles 312.

The binder composition 310 applied on fibers 304 forms a fiber and binder amalgam on the top surface of the conveyor belt 306. The belt 306 may be perforated and/or porous to allow excess binder composition 310 to pass through the belt 306 to a collection unit (not shown) below. The collection unit may include filters and circulation pumps to recycle at least a portion of the excess binder back to the binder supply unit 308.

The conveyor belt 306 transports the amalgam to an oven 314 where it is heated to a curing temperature and the binder composition starts to cure. The temperature of the oven 314 and the speed of the conveyor belt 306 can be adjusted to control the curing time and temperature of the amalgam. In some instances, process conditions may set to completely cure the amalgam into the fiber-containing composite. In additional instances, process conditions may be set to partially cure the amalgam into a B-staged composite.

The amalgam may also be compressed prior to or during the curing stage. System 300 shows an amalgam being compressed by passing under a plate 316 that tapers downward to decrease the vertical space available to the curing amalgam. The amalgam emerges from under the plate 316 in a compressed state and has less thickness than when it first made contact with the plate. The taper angle formed between the plate 316 and conveyor belt 306 can be adjusted to adjust the level of compression placed on the amalgam. The partially or fully cured composite that emerges from under plate 316 can be used for a variety of applications, including construction materials such as pipe, duct, and/or wall insulation, among other applications.

Exemplary Fiber Composites

Figure 4A:
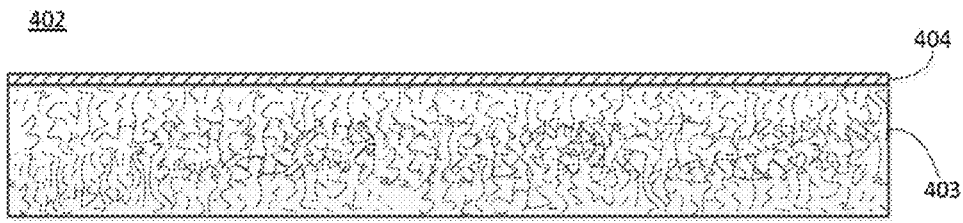
FIG. 4A-C illustrate a simplified schematics of exemplary composite materials according to embodiments of the invention.
Figure 4B:
Figure 4C:
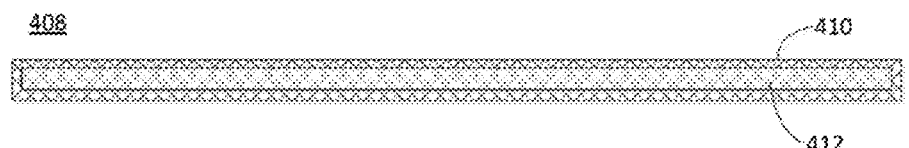

FIG. 4A-C illustrate some of exemplary composite materials made with the present sequestrant-containing binder formulations. FIG. 4A is a simplified schematic of an exemplary fiber-containing batt material 402 that may be used for building insulation. The material 402 may include a batt 403 of non-woven fibers held together by the binder. The fibers may be glass fibers used to make fiberglass insulation (e.g, low-density or high-density fiberglass insulation), or a blend of two or more types of fibers, such as a blend of glass fibers and organic polymer fibers, among other types of fibers. In some examples, a facer 404 may be attached to one or more surfaces of the batt 403.

FIG. 4B is a simplified schematic of an exemplary fiber-containing composite board 406 that may be used as an insulation board, duct board, elevated temperature board, etc. The fibers in board 406 may include glass fibers, organic polymer fibers, carbon fibers, mineral fibers, metal fibers, among other types of fibers, and blends of two or more types of fibers.

FIG. 4C is a simplified schematic of an exemplary fiber-containing flexible insulation material 408 that may be used as a wrap and/or liner for ducts, pipes, tanks, equipment, etc. The fiber-containing flexible insulation material 408 may include a facer 410 attached to one or more surfaces of the fiber material 412. Exemplary materials for the facer 410 may include fire-resistant foil-scrim-kraft facing.

Specific examples of fiber-containing composites that use the present binder compositions include low-density fiberglass insulation (e.g., less than about 0.5 lbs/ft$^3$) and high-density fiberglass insulation.

EXAMPLES

The efficiency levels of some exemplary sequestrants were measured by determining threshold concentrations of the sequestrants needed to prevent formation of precipitates in a binder formulation prepared as follows: Mineralized water containing 10,000 ppm calcium, magnesium and sodium ions, 5000 ppm of iron ions, and 500 ppm of aluminum ions, was added to a binder solution in a water:binder weight ratio of 80:20. The binder solution included dextrose mixed with a urea-glyoxal crosslinking agent and 2.5 wt. % ammonium sulfate, 2.5 wt. % diammonium phosphate, and 2 wt. % amino-silane (A-1100).

Sequestrants were added to the above-described binder formulation and threshold sequestrant concentrations were measured below which a salt precipitate would appear. Table 1 shows the threshold precipitate concentrations in wt. % of the added sequestrant in the binder formulation:

TABLE 1

Threshold Sequestrant Concentrations to Prevent Salt Precipitation:

| Sequestrant | Threshold Sequestrant Conc (wt. %) |
|---|---|
| EDTA | 0.2 |
| Citric Acid | 1.0 |
| Polyacrylic Acid | 1.1-1.5 |
| Polyphosphonic Acid | 0.15 |
| Styrene Malic Anhydride (SMA) | 1.2 |

As a control the mineralized water was replaced with deionized water and no precipitation was observed when the DI water and binder solution were mixed even in the absence of a sequestrant.

The results of Table 1 show that all the polycarboxylic acid and polyphosphonic acid group sequestrants showed some level of efficiency preventing the precipitation of salts from the mineral water and binder solution combination. The highest efficiencies for this combination of multivalent ions were observed with EDTA and polyphosphonic acid sequestrants.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An aqueous binder composition comprising:
   a carbohydrate;
   a sequestrant for one or more multivalent ions, wherein the sequestrant reduces a precipitation rate for the multivalent ions from the aqueous binder composition; and
   a polymerization catalyst.

2. The aqueous binder composition of claim 1, wherein the sequestrant comprises a polycarboxylic acid compound.

3. The aqueous binder composition of claim 1, wherein the polycarboxylic acid compound comprises at least three carboxylic acid groups.

4. The aqueous binder composition of claim 1, wherein the sequestrant comprises ethylenediaminetetraacetic acid (EDTA).

5. The aqueous binder composition of claim 1, wherein the sequestrant comprises citric acid.

6. The aqueous binder composition of claim 1, wherein the sequestrant comprises a polyacrylic acid compound or a salt of a polyacrylic acid compound.

7. The aqueous binder composition of claim 1, wherein the sequestrant comprises a polyphosphonic acid compound or a polyphosphoric acid compound.

8. The aqueous binder composition of claim 7, wherein the sequestrant comprises at least three phosphonic acid groups.

9. The aqueous binder composition of claim 7, wherein the sequestrant comprises ethylenediaminetetramethylenephosphonic acid.

10. The aqueous binder composition of claim 1, wherein the one or more multivalent ions are selected from the group consisting of calcium ions, magnesium ions, barium ions, aluminum ions, and iron ions.

11. The aqueous binder composition of claim 1, wherein the polymerization catalyst is selected from the group consisting of a Lewis acid, a protic acid, and a latent acid.

12. The aqueous binder composition of claim 11, wherein the Lewis acid is selected from the group consisting of aluminum sulfate, ferric sulfate, aluminum chloride, ferric chloride, aluminum phosphate, and ferric phosphate.

13. The aqueous binder composition of claim 11, wherein the protic acid is selected from the group consisting of sulfuric acid, phosphoric acid, hydrochloric acid, nitric acid, toluene sulfonic acid, methane sulfonic acid, and a carboxylic acid.

14. The aqueous binder composition of claim 11, wherein the latent acid is selected from the group consisting of ammonium sulfate, ammonium hydrogen sulfate, monoammonium phosphate, diammonium phosphate, ammonium chloride, and ammonium nitrate.

15. The aqueous binder composition of claim 1, wherein the polymerization catalyst is an organo-metallic salt selected from the group consisting of an organo-titanate salt, an organo-zirconate salt, and organo-tin salt, and an organo-aluminum salt.

16. The aqueous binder composition of claim 1, wherein the carbohydrate is a reducing sugar.

17. The aqueous binder composition of claim 1, wherein the binder composition further comprises a reaction product of a urea compound and an aldehyde-containing compound.

18. The aqueous binder composition of claim 17, wherein the urea compound has the formula $R_1R_2N-CO-NR_3R_4$, where $R_1$, $R_2$, $R_3$, and $R_4$ are independently selected from the group consisting of H, an alkyl group, an aromatic group, and an alkoxy group.

19. The aqueous binder composition of claim 18, wherein the urea compound comprises $H_2N-CO-NH_2$.

20. The aqueous binder composition of claim 17, wherein the aldehyde-containing compound is selected from the group consisting of acetaldehyde, butyraldehyde, acrolein, furfural, glyoxal, gluteraldehyde, and polyfurfural.

21. The aqueous binder composition of claim 20, wherein the aldehyde-containing compound is glyoxal.

22. The aqueous binder composition of claim 1, wherein the binder composition further comprises a polyacrylic acid compound.

23. The aqueous binder composition of claim 22, wherein the binder composition further comprises an alkanol amine.

24. The aqueous binder composition of claim 23, wherein the alkanol amine is triethanol amine.

25. The aqueous binder composition of claim 22, wherein the binder composition further comprises sodium hypophosphite.

26. The composition of claim 1, wherein the sequestrant is present at a concentration of between about 0.1 wt. % and about 2 wt % of the aqueous binder composition.

27. The composition of claim 1, wherein the sequestrant is present at a concentration of below about 1 wt. % of the aqueous binder composition.

28. The composition of claim 1, wherein the sequestrant comprises a salt of a polyacrylic acid compound.

29. The composition of claim 1, wherein the sequestrant consists of a polyacrylic acid, and the composition does not comprise other sequestrants.

30. The composition of claim 1, wherein the sequestrant comprises citric acid.

31. The composition of claim 1, wherein the sequestrant comprises styrene malic anhydride.

32. The composition of claim 1, wherein the sequestrant comprises five or more carboxylic acid groups.

* * * * *